United States Patent
Sadi-Haddad et al.

(10) Patent No.: US 10,116,246 B2
(45) Date of Patent: Oct. 30, 2018

(54) ELECTRICAL INSTALLATION COMPRISING AN ELECTRICAL APPARATUS, A THREE-PHASE INVERTER AND A CONTROL DEVICE FOR CONTROLLING THE INVERTER, AND RELATED METHOD

(71) Applicants: Lakdar Sadi-Haddad, Le Perreux-sur-Marne (FR); Joaquim Da Silva, Sennely (FR); Andre Deandrade, Vernon (FR)

(72) Inventors: Lakdar Sadi-Haddad, Le Perreux-sur-Marne (FR); Joaquim Da Silva, Sennely (FR); Andre Deandrade, Vernon (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 0 days.

(21) Appl. No.: 15/259,467

(22) Filed: Sep. 8, 2016

(65) Prior Publication Data

US 2017/0070174 A1    Mar. 9, 2017

(30) Foreign Application Priority Data

Sep. 9, 2015   (EP) .................................... 15306377

(51) Int. Cl.
| | |
|---|---|
| *H02P 21/05* | (2006.01) |
| *H02P 21/00* | (2016.01) |
| *H02P 6/10* | (2006.01) |
| *H02P 29/50* | (2016.01) |

(52) U.S. Cl.
CPC ................ *H02P 21/50* (2016.02); *H02P 6/10* (2013.01); *H02P 21/05* (2013.01); *H02P 29/50* (2016.02)

(58) Field of Classification Search
CPC .. H02P 21/05; H02P 21/50; H02P 6/10; H02P 29/50
See application file for complete search history.

(56) References Cited

U.S. PATENT DOCUMENTS

| | | | |
|---|---|---|---|
| 2003/0001536 A1* | 1/2003 | Kitajima ................... | H02P 6/10 318/629 |
| 2013/0193898 A1* | 8/2013 | Williams ................. | G05B 5/01 318/504 |
| 2014/0369091 A1* | 12/2014 | Bauer ............... | H02M 7/53875 363/44 |

\* cited by examiner

*Primary Examiner* — Eduardo Colon Santana
*Assistant Examiner* — Said Bouziane
(74) *Attorney, Agent, or Firm* — Bryan Peckjian; SKF USA Inc. Patent Dept.

(57) ABSTRACT

The invention concerns an electrical installation providing an apparatus, a three-phase inverter and a control device, the inverter being adapted for generating a three-phase current presenting a first frequency for operating the apparatus and an undesired frequency component presenting a second frequency. The control device is adapted for measuring a parameter of each phase of the current, the measured parameters forming a measurement vector, and for calculating a Clarke transform, providing a first vector represented in a first basis of a two-dimensional vector space, of the measurement vector. The control device is adapted for generating a representation of the first vector in a second basis of the vector space, the second basis rotating at the second frequency with respect to the first basis.

4 Claims, 3 Drawing Sheets

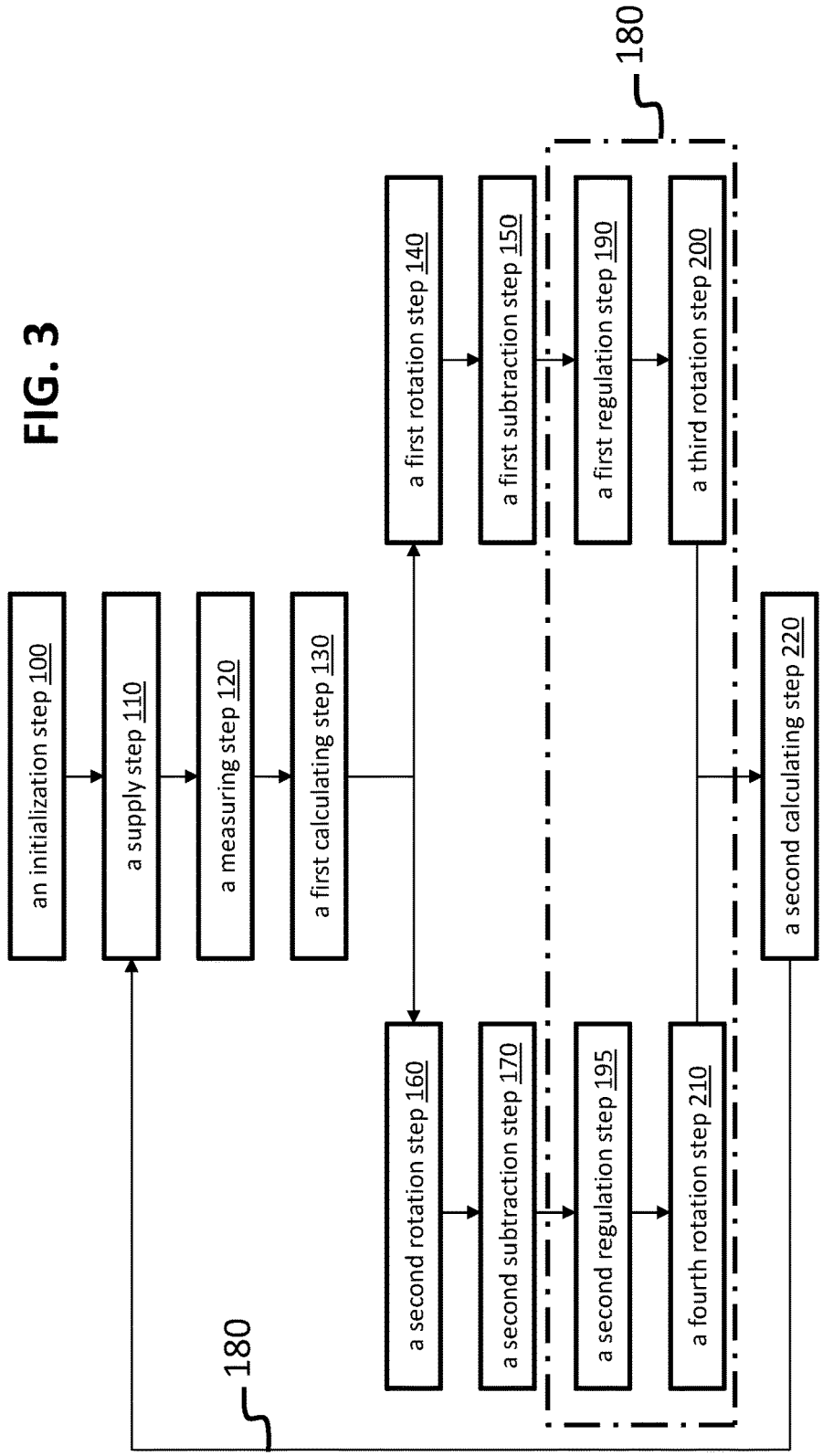

ELECTRICAL INSTALLATION COMPRISING AN ELECTRICAL APPARATUS, A THREE-PHASE INVERTER AND A CONTROL DEVICE FOR CONTROLLING THE INVERTER, AND RELATED METHOD

CROSS REFERENCE TO RELATED APPLICATIONS

This application claims priority to European patent application no. 15306377.1 filed on Sep. 9, 2015, the contents of which are fully incorporated herein by reference.

FIELD OF THE INVENTION

The present invention concerns an electrical installation comprising an electrical apparatus, a three-phase inverter and a control device. The present invention also concerns a method for controlling a three-phase inverter.

BACKGROUND OF THE INVENTION

Electrical installations frequently provide electrical apparatuses requiring a three-phase electrical supply. For example, many electrical motors are supplied electrically by such three-phase voltages which generate three-phase load current. The frequency and the amplitude of the three-phase current is therefore regulated by the electrical installation as a means of commanding the operation of the electrical apparatus. The frequency and the amplitude of the three-phase current influence directly the operation of the electrical apparatus: for example, in the case of permanent-magnet synchronous motors, the rotation frequency of the motor is equal to the current frequency divided by the number of pairs of poles in the motor.

As a consequence, such electrical installations usually provide a three-phase electric inverter generating the three-phase current, and the inverter is controlled by a control device driving the amplitude of the three-phase current.

However, the electrical apparatuses known in the state of the art are not reliable. Indeed, the three-phase current generated by the inverter is not very well controlled. More precisely, the control devices currently used cannot regulate perfectly all frequency ranges. Consequently, the three-phase current often contains undesired harmonics, having frequencies out of the control device's frequency range. These harmonics may be caused, for example, by "DC bus voltage ripple", in which a DC current supplied to the inverter has a small residual temporal variation, or during the operation of the inverter.

Such undesired harmonics may lead to undesired heating of the electrical apparatus, sometimes damaging or even destroying the apparatus. In order to avoid such damage, electrical apparatuses, and especially motors, are designed according to demanding guidelines to provide for high redundancy and important security margins. Their manufacture is consequently complicated, and their price increased.

BRIEF SUMMARY OF THE INVENTION

The aim of the invention is to provide an electrical installation, comprising an electrical apparatus and an inverter supplying the electrical apparatus with a three-phase voltage, having an improved reliability and a reduced cost.

Thanks to the invention, the amplitude of an undesired harmonic is efficiently kept within acceptable limits preferably close to zero. The reliability of the electrical installation is therefore improved. Additionally, the electrical apparatus of the installation can be manufactured according to lighter requirements, at a lower cost, while maintaining an identical reliability.

BRIEF DESCRIPTION OF THE SEVERAL VIEWS OF THE DRAWING

The invention will now be explained, as an illustrative example and without restraining the object of the invention, in correspondence with the associated figures in which:

FIG. 3 represents a flow chart of a method for operating the control device of FIG. 1.

DETAILED DESCRIPTION OF THE INVENTION

Figure 1:
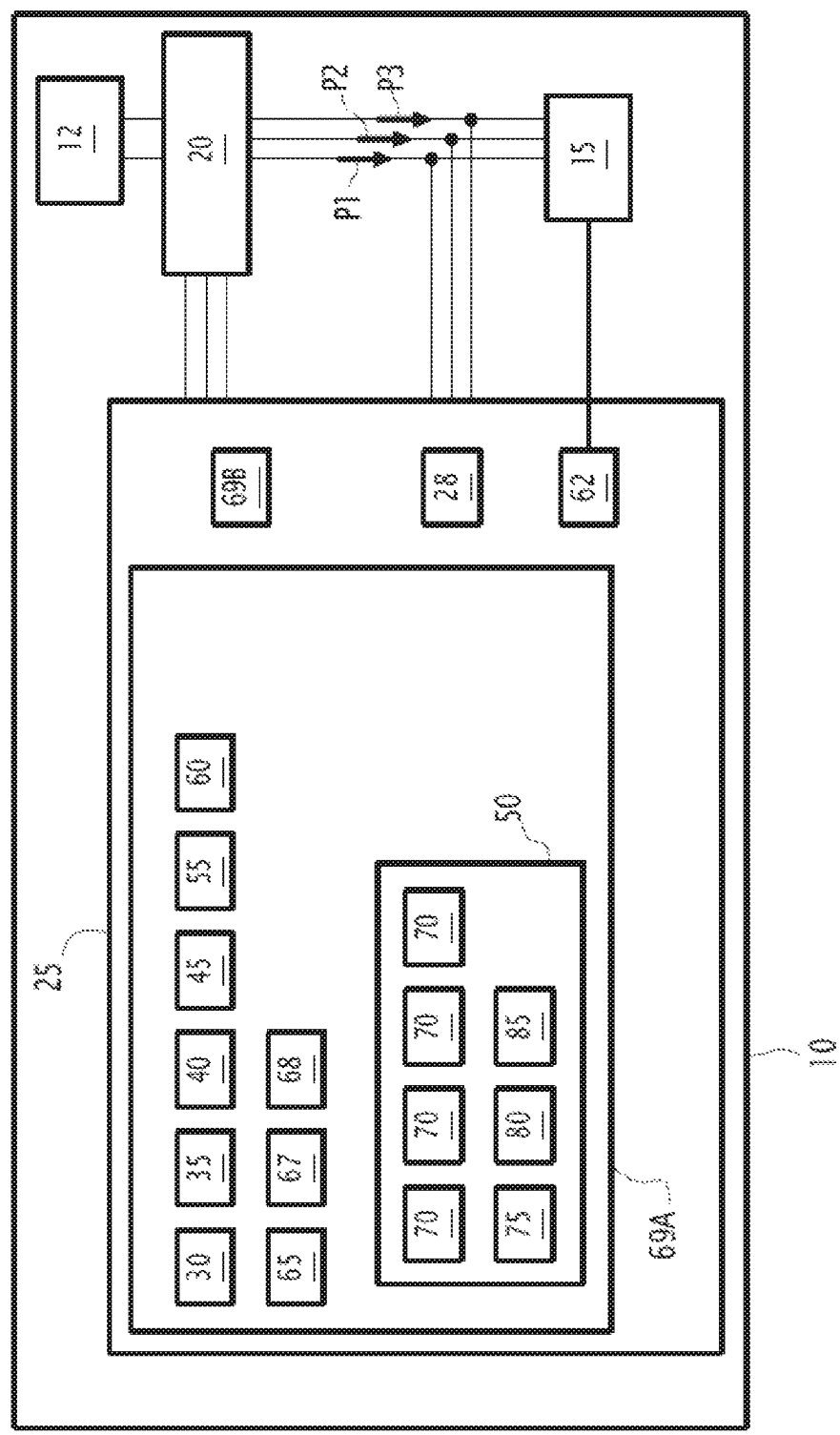
FIG. 1 represents a schematic view of an electrical installation according to the invention and comprising an electrical apparatus, a controller and a control device for controlling the inverter.

An electrical installation 10 according to the invention is represented on FIG. 1. The electrical installation 10 provides a DC link capacitor 12, an electrical apparatus 15, an inverter 20 and a control device 25.

The DC link capacitor 12 is adapted for receiving a rectified grid voltage VC from a mains distribution network and for generating a direct current DC from the rectified grid voltage VC by smoothing it.

The rectified grid voltage VC supplied by the mains distribution network has a network frequency nf and a network voltage nv. The network frequency nf is, for example, provided between 45 Hertz (Hz) and 65 Hz. The network voltage nv is provided between 380 Volt (V) and 480 V.

The electrical apparatus 15 is a permanent-magnet synchronous motor. A permanent-magnet synchronous motor is an electrical motor comprising a rotor and a stator, wherein the rotor includes at least one permanent magnet and the stator includes three windings supplied with a three-phase electrical current C.

The electrical apparatus 15 has an operating frequency fo. The operating frequency fo is defined as the rotation frequency of the rotor with respect to the stator.

The electrical apparatus 15 has a nominal operating frequency no, which is defined as the rotation frequency of the rotor for which the electrical apparatus 15 produces the greatest rotational torque.

The rotor presents a number n of pairs of poles, for example two poles.

The inverter 20 is adapted for generating, from a DC bus voltage, the three-phase current C, and for supplying the electrical apparatus 15 with the three-phase current C. The inverter 20 is also configured for modifying the three-phase current C depending on a control signal CS generated by the control device 25.

The control signal CS is, for example, a digital control signal CS. The control signal CS is a set of three control values vc.

For example, the inverter 20 provides an inverting module 22 and a modulator 23.

The inverting module 22 provides six pairs of two switches, each pair of switches commanding the supply of an electrical connector with the DC current.

The modulator 23 is adapted for generating six command signals and for transmitting each switch of the inverting module 22 with a respective command signal. Each command signal is, for example, generated by the modulator 23 by pulse-width modulation. This means that the modulator is adapted for comparing each control value to a carrier wave, and for generating a respective command signal depending solely on the sign of the comparison.

The carrier wave is a variable current, for example a triangular current, presenting a switching frequency sf.

Such inverters 20 comprising an inverting module 22 and a modulator 23 are known in the current state of the art.

The electrical current C includes a first phase P1, a second phase P2 and a third phase P3.

Each phase P1, P2, P3 has a voltage and a current.

The voltage of each phase P1, P2, P3 is, for example, provided between 270 V and 390 V for applications using passive rectifiers. The voltage of each phase P1, P2, P3 can be much higher for applications using active rectifiers.

The electrical current C is balanced. This means that the sum of the current of each three phases P1, P2, P3 is equal to zero.

Each phase P1, P2, P3 has a plurality of frequency components. This means that each phase P1, P2, P3 can be described as being the sum of a plurality of alternating currents called frequency components. More precisely, each phase P1, P2, P3 has a main frequency component MF and at least one undesired frequency component UF, form example several undesired frequency components.

An undesired frequency component UF is, for example, a frequency component that has previously been identified as having potential undesired effects.

Each frequency component has a frequency and an amplitude.

The main frequency component MF is the frequency component that has the largest amplitude of all frequency components. The main frequency component MF has a first frequency f1 and a first amplitude a1. The first frequency f1 is identical for each phase P1, P2, P3.

The first frequency f1 is provided between 0 Hz and the number of pairs of poles multiplied by the nominal operating frequency no of the electrical apparatus 15.

The undesired frequency component UF has a second amplitude a2. The undesired frequency component UF has a second frequency f2.

For example, in a case where the electrical apparatus 15, the inverter 20 and the control device 25 form a closed-loop system, the first frequency f1 is provided in a frequency range that the closed-loop system is able to regulate but the second frequency f2 is not provided in a frequency range that the closed-loop system is able to regulate.

The control device 25 is configured for measuring a parameter p1, p2, p3 of each phase P1, P2, P3 and for generating the control signal CS from the measured parameters P1, P2, P3 and from at least one reference value r1, r2. The control device 25 is also configured for transmitting the control signal CS to the inverter 20.

Figure 2:
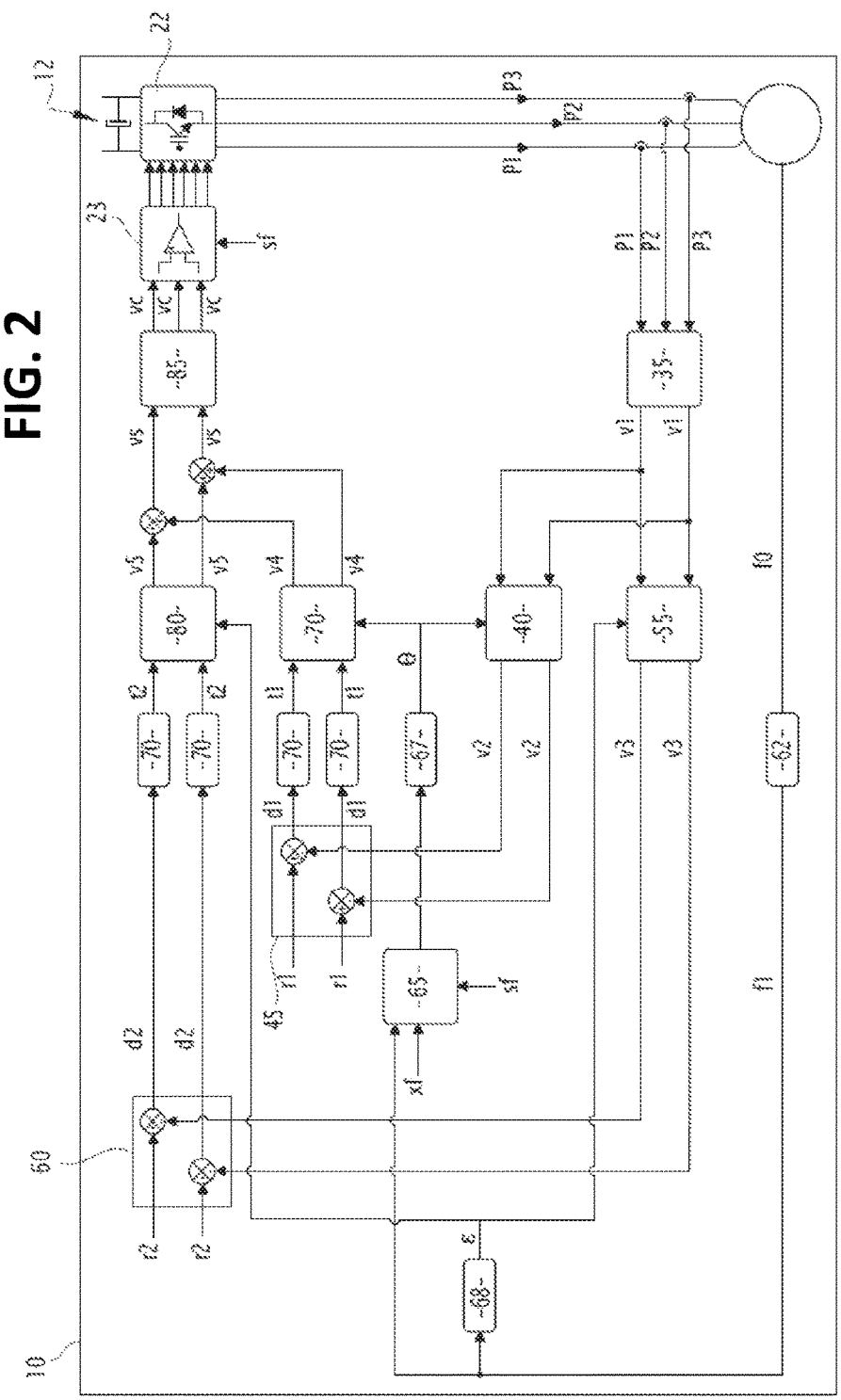
FIG. 2 is a block diagram of the installation of FIG. 1 showing its closed-loop structure.

The control device 25 is adapted for forming with the inverter 20 and the electrical apparatus 15 a closed-loop system for regulating the three-phase electrical current C. The closed-loop structure of the system is best seen on FIG. 2.

The control device 25 provides a sensor 28, a measurement module 30, a first Clarke calculation module 35, a first rotation module 40, a first subtraction module 45, a command module 50, a second rotation module 55, a second subtraction module 60, an estimation module 62, an identification module 65, a first integration module 67 and a second integration module 68.

For example, the control device 25 provides a memory 69A and a processor 69B. The memory 69A is adapted for storing a measurement program 30, a first Clarke calculation program 35, a first rotation program 40, a first subtraction program 45, a command program 50, a second rotation program 55, a second subtraction program 60, an identification program 65, a first integration program 67 and a second integration program 68.

When they are executed by the processor 69B, the measurement program 30, the first Clarke calculation program 35, the first rotation program 40, the first subtraction program 45, a command program 50, the second rotation program 55, the second subtraction program 60, the identification program 65, the first integration program 67 and the second integration program 68 constitute respectively a measurement module, a first Clarke calculation module, a first rotation module, a first subtraction module, a command module, a second rotation module, a second subtraction module, an identification module, a first integration module and respectively a second integration module.

As an alternative, the measurement program 30, the first Clarke calculation module 35, the first rotation module 40, the first subtraction module 45, the command module 50, the second rotation module 55, the second subtraction module 60, the identification module 65, the first integration module 67 and the second integration module 68 are provided as programmable logic devices such as FPGAs, or as application-specific integrated circuits.

A field-programmable gate array (FPGA) is an integrated circuit designed to be configured by a customer or a designer after manufacturing.

The sensor 28 is configured for measuring a parameter p1, p2, p3 of each phase P1, P2, P3. Each parameter p1, p2, p3 is, preferably, the current of the respective phase P1, P2, P3.

For example, each sensor 28 provides three Hall effect sensors, one for each phase P1, P2, P3. A Hall effect sensor is a transducer that varies its output voltage in response to a magnetic field generated by an electrical current.

Alternately, each sensor 28 provides three Rogowsky coil sensors, one for each phase P1, P2, P3. Rogowsky coil sensors are sensitive to voltages inductively generated in a coil surrounding an electrical conductor in which the electrical current is circulating.

The measurement module 30 is configured for acquiring each parameter p1, p2, p3 measured by the sensors 28. For example, the measurement module 30 is an analogic/digital converter adapted for converting an analogic output of the sensor 28 into a numerical parameter p1, p2, p3. When acquired by the measurement module 30, the parameters p1, p2, p3 constitute a measurement vector Vm.

In the frame of this description, a vector is defined as a mathematical object that is part of a multi-dimensional space called vector space. For example, a set of three numbers constitutes a vector of a three-dimensional vector space. Each vector is represented in a basis of the vector space.

A basis of the vector space is a collection of vectors that spans the whole space and is linearly independent. Therefore, each vector of the vector space can be represented as a unique linear combination of the vectors of the basis. This means that each vector of the vector space can be calculated by multiplying each vector of the basis by a respective coefficient and summing the results of the multiplications. In consequence, each vector can be represented, in the basis, by the corresponding set of coefficients. The same vector may also be represented, in another basis, by a different set of coefficients.

For example, in the case of the measurement vector Vm, the vector space is the space of all possible values for the parameters p1, p2, p3, each vector of the basis is a vector in which the value of one parameter p1, p2, p3 is equal to one and the values of the other parameters p1, p2, p3 are each equal to zero, and the measurement vector Vm is a set of three numbers, each number being equal to the measured current p1, p2, p3 of the respective phase P1, P2, P3. This is written mathematically:

$$Vm = \begin{pmatrix} p1 \\ p2 \\ p3 \end{pmatrix} \quad \text{(Equation 1)}$$

The first Clarke calculation module 35 is adapted for calculating a Clarke transform CT of the measurement vector Vm. The Clarke transformation (also known as the alpha-beta transformation) is a mathematical transformation employed to simplify the analysis of three-phase circuits.

The first rotation module 40 is adapted for calculating a first rotation matrix and generating a second vector V2 from the Clarke transform CT. The second vector V2 contains two second values v2.

The first subtraction module 45 is adapted for comparing each second value v2 to a corresponding first reference value r1 for generating a corresponding first difference d1.

Each first reference value r1 is a command value transmitted by a user U of the electrical installation 10. In another embodiment, each first reference value r1 is generated automatically by a dedicated software program.

The command module 50 is adapted for generating the control signal CS from at least the first differences d1.

The command module 50 provides at least two controllers 70, a third rotation module 75, a fourth rotation module 80, and a second Clarke calculation module 85.

For example, the command program provides a controller program, a third rotation program, a second calculation program and a fourth rotation program. When they are executed by the processor 69B, the controller program, the third rotation program, the second calculation program and the fourth rotation program constitute respectively a controller 70, a third rotation module 75, a fourth rotation module 80 and a second Clarke calculation module 85.

In a preferred embodiment, the command module 50 provides at least two controllers 70, preferably four controllers 70. For example, when the command program 50 is executed on the processor 69B, the controller program 70 performs the same operations in parallel for four different datasets.

The second rotation module 55 is adapted for generating a third vector V3 from the Clarke transform CT. The third vector V3 contains two third values v3.

The second subtraction module 60 is adapted for comparing each third value v3 to a corresponding second reference value r2 for generating a corresponding second difference d2.

The estimation module 62 is adapted for measuring the operating frequency fo and for estimating the first frequency f1 from the operating frequency fo.

For example, the estimation module 62 provides a rotary encoder. A rotary encoder, also called a shaft encoder, is an electro-mechanical device that converts the angular position or motion of a shaft or axle to an analog or digital code.

The estimation module 62 is adapted for estimating the first frequency f1 by multiplying the measured operating frequency fo by the number n of pairs of poles of the rotor.

In a preferred embodiment, the estimation module 62 is also adapted for estimating the second constant φ2. For example, the estimation module 62 is adapted for estimating the second constant φ2 from an initial angle αi of the rotor with respect to the stator at a start of the electrical apparatus 15.

The identification module 65 is adapted for identifying the undesired frequency component UF. For example, the identification module 65 is adapted for calculating the second frequency f2 from at least the first frequency f1.

Preferably, the identification module 65 is adapted for calculating the second frequency f2 from the first frequency f1, the network frequency of and the switching frequency sf of the carrier wave used by the modulator 23 of the inverter 20.

In another embodiment, the identification module 65 is adapted for measuring the second frequency f2 from the measured parameters p1, p2, p3.

The first integration module 67 is configured for calculating an integral of the second frequency f2.

The second integration module 68 is configured for calculating an integral of the first frequency f1.

Each controller 70 is adapted for generating a transitional signal t1, t2 from a first difference d1 or from a second difference d2. Each transitional signal t1, t2 is a real number.

Preferably, two controllers 70 are each adapted for generating a first transitional signal t1 from a respective first difference d1, and two controllers 70 are each adapted for generating a second transitional signal t2 from a respective second difference d2.

Both first transitional signals t1 form a first transitional vector T1, and both second transitional signals t2 form a second transitional vector T2. Each transitional vector T1, T2 is a vector of a two-dimensional vector space.

Each controller 70 is a proportional-integral controller. A proportional-integral controller is a control loop feedback mechanism (controller) widely used in industrial control systems. In this case, each controller 70 is adapted for generating a transitional signal t1, t2 from the latest difference d1, d2 that the controller 70 has received and from the previous values of the differences d1, d2.

The third rotation module 75 is adapted for generating, from the first transitional vector T1, a fourth vector V4. The fourth vector V4 is a vector of a two-dimensional vector space. The fourth vector V4 contains two fourth values v4.

The fourth rotation module 80 is adapted for generating, from the second transitional vector T2, a fifth vector V5. The fifth vector V5 is a vector of a two-dimensional vector space. The fifth vector V5 contains two fifth values v5.

The second Clarke calculation module 85 is configured for calculating, from at least the fourth vector V4, the control signal CS. In a preferred embodiment, the second Clarke calculation module 85 is configured for calculating the control signal CS from the fourth vector V4 and the fifth vector V5.

A flow chart of a method for controlling the three-phase inverter 20 is represented on FIG. 3. The method provides an initialization step 100, a supply step 110, a measuring step 120, a first calculating step 130, a first rotation step 140, a first subtraction step 150, a second rotation step 160, a second subtraction step 170, and a control step 180.

Before an initialization step 100, the electrical apparatus 15 is not active. The three-phase current C is not generated, and the rotor is immobile with respect to the stator.

During the initialization step 100, the initial value αi of the angle between rotor and stator is fixed to a predetermined value.

In the initialization step 100, each second reference value r2 is provided by the user U depending for example on a desired value of the operation frequency fo. The second reference values r2 are predetermined quantities known to the user U. For example, tables associating second reference values r2 to desired operation frequencies fo are provided by a manufacturer of the installation 10. Else, the tables associate second reference values r2 to desired torques of the electrical apparatus.

In another embodiment, each second reference value r2 is calculated by the user U according to a dedicated software such as a field weakening algorithm known to the art.

The control signal CS is generated by the control device 25. During the initialization step, each control value vc of the control signal CS is equal to an initial control value vi.

During the supply step 110, the three-phase current C is generated by the inverter 20, according to the control signal CS.

In the supply step 110, the operating frequency of the electrical apparatus is measured by the estimation module 62, and the first frequency f1 is estimated.

During the supply step 110, the undesired frequency component UF is also identified by the identification module 65. For example, the identification module 65 calculates the second frequency f2 from a mathematical model.

In another embodiment, the identification module 65 compares the calculated first frequency f1 to a table associating different values of the first frequency f1 to corresponding undesired frequency components UF known to be existing when the three-phase current C has the first frequency f1.

Each first reference value r1 is then chosen by the user U depending on a desired value of the second amplitude a2. Preferably, each first reference value r1 is equal to zero.

Then, in the measuring step 120, the parameter p1, p2, p3 of each phase P1, P2, P3 are measured by the sensors 28 and acquired by the measurement module 30. The measurement module 30 generates the measurement vector Vm from the measured parameters p1, p2, p3.

Next, during the first calculating step 130, the Clarke transform CT of the measurement vector Vm is calculated by the first Clarke calculation module 35.

The Clarke transform CT provides a first vector V1. The first vector V1 is obtained by a multiplication of the measurement vector Vm by a matrix called the Clarke matrix M defined mathematically as:

$$M = \frac{2}{3}\begin{pmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{pmatrix} \qquad \text{(Equation 2)}$$

The product of the multiplication of the measurement vector Vm by the Clarke matrix is a product vector Vp. The product vector Vp contains a first product value vp1, a second product value vp2, and a third product value vp3. The product vector Vp is obtained according to the equation:

$$Vp = M \cdot Vm \qquad \text{(Equation 3)}$$

in which "·" notes the multiplication of a matrix and a vector.

As the three-phase current C is balanced, the third product value vp3 is equal to zero. The Clarke transformation is therefore frequently used for simplifying the analysis of three-phase current systems by converting three-dimensional vectors into two-dimensional vectors.

The first vector V1 provides two first values v1. Each first value v1 is equal to a respective product value among the first product value vp1 and the second product value vp2. The first vector V1 is the projection of the product vector Vp in a two-dimensional vector space sometimes called the Clarke plane.

The first vector V1 is defined in a first basis of the two-dimensional vector space.

A second basis is defined for the two-dimensional vector space.

The second basis rotates at the second frequency f2 with respect to the first basis. This means that a first angle θ is defined between a vector of the first basis and a vector of the second basis, the first angle θ being a first linear function of time t following the equation:

$$\theta = 2\pi * f2 * t + \varphi1 \qquad \text{(Equation 4)}$$

where π is the ratio between a circle's perimeter and its diameter,

\* is the operation of multiplication, t is time, time being equal to zero when the electrical apparatus 15 is started, and φ1 is a first constant.

A third basis is also defined for the two-dimensional vector space.

The third basis rotates at the first frequency f1 with respect to the first basis. This means that a second angle ε is defined between the first basis and the third basis, the second angle ε being a first linear function of time t following the equation:

$$\varepsilon = 2\pi * f1 * t + \varphi2 \qquad \text{(Equation 5)}$$

where π is the ratio between a circle's perimeter and its diameter,

\* is the operation of multiplication, t is time and

φ2 is a second constant depending on the initial value αi of the angle between rotor and stator.

During the first calculating step 130, the first angle θ and the second angle ε are calculated, respectively, by the first integration module 67 and by the second integration module 68.

The first angle θ is calculated, by the first integration module 67, by integrating the second frequency f2 over time t.

The second angle ε is calculated, by the second integration module 68, by integrating the first frequency f1 over time t.

Next, during the first rotation step 140, the second vector V2 is generated by the first rotation module 40.

The second vector V2 is a representation of the first vector V1 in the second basis of the two-dimensional vector space.

The first rotation module 40 generates the second vector V2 by multiplying the first vector V1 by a first rotation matrix RM1. The first rotation matrix RM1 is defined mathematically as:

$$RM1 = \begin{pmatrix} \cos\theta & -\sin\theta \\ \sin\theta & \cos\theta \end{pmatrix} \quad \text{(Equation 6)}$$

where cos is the cosine function and sin is the sine function.

Then, in the first subtraction step 150, each second value v2 of the second vector V2 is compared, by first the subtraction module 45, to the corresponding first reference value r1. Thus, at the end of the first subtraction step 150, two first differences d1 have been calculated.

In the second rotation step 160, the third vector V3 is generated by the second rotation module 55.

The third vector V3 is a representation of the first vector V1 in the third basis of the two-dimensional vector space.

The second rotation module 55 is configured for generating the third vector V3 by multiplying the first vector V1 by a second rotation matrix RM2. The second rotation matrix RM2 is defined mathematically as:

$$RM2 = \begin{pmatrix} \cos\varepsilon & -\sin\varepsilon \\ \sin\varepsilon & \cos\varepsilon \end{pmatrix} \quad \text{(Equation 7)}$$

where cos is the cosine function and sin is the sine function.

Then, in the second subtraction step 170, each third value v3 is compared, by the second subtraction module 60, to a corresponding second reference value r2 for generating a corresponding second difference d2.

The first rotation step 140 and the first subtraction step 150 are preferably performed simultaneously with the second rotation step 160 and the second subtraction step 170. For example, each of the first 140 and the second 160 rotation steps are each performed simultaneously with the other, and both subtraction steps 150, 170 are also performed simultaneously with each other.

This is in particular the case when the respective modules are provided as FPGAs. Other programmable logic devices may perform steps 140 to 170 sequentially.

During the control step 180, the control signal CS is generated, by the control module 50, from at least the first differences d1. The control signal CS is, preferably, generated from the first differences d1 and the second differences d2.

The control step 180 provides a first regulation step 190, a second regulation step 195, a third rotation step 200, a fourth rotation step 210 and a second calculation step 220.

During the first regulation step 190, each first transitional signal t1 is calculated by a corresponding controller 70 from a respective first difference d1. Thus, at the end of the first regulation step 190, the first transitional vector T1 has been generated.

During the second regulation step 195, each second transitional signal t2 is calculated by a corresponding controller 70 from a respective second difference d2. Thus, at the end of the second regulation step 195, the second transitional vector T2 has been generated.

Both regulation steps 190, 195 are, preferably, performed simultaneously.

During the third rotation step 200, the third rotation module 75 calculates the fourth vector V4 from the first transitional vector T1.

The fourth vector V4 is a representation of the first transitional vector T1 in the first basis. Preferably, the third rotation module 75 is configured for generating the fourth vector V4 by multiplying the first transitional vector T1 by a third rotation matrix RM3. The third rotation matrix RM3 is an inverse rotation matrix of the first rotation matrix RM1.

The third rotation matrix RM3 is defined mathematically as:

$$RM3 = \begin{pmatrix} \cos\theta & \sin\theta \\ -\sin\theta & \cos\theta \end{pmatrix} \quad \text{(Equation 8)}$$

During the fourth rotation step 210, the fifth vector V5 is generated by the fourth rotation module 80 from the second transitional vector T2.

The fifth vector V5 is a representation of the second transitional vector T2 in the first basis. Preferably, the fourth rotation module 80 is configured for generating the fifth vector V5 by multiplying the second transitional vector T2 by a fourth rotation matrix RM4. The fourth rotation matrix RM4 is an inverse rotation matrix of the second rotation matrix RM2.

The fourth rotation matrix RM4 is defined by the equation:

$$RM4 = \begin{pmatrix} \cos\varepsilon & \sin\varepsilon \\ -\sin\varepsilon & \cos\varepsilon \end{pmatrix} \quad \text{(Equation 9)}$$

The third rotation step 200 and the fourth rotation step 210 are, preferably, performed simultaneously by respectively the third rotation module 75 and the fourth rotation module 80.

During the second calculation step 220, the second Clarke calculation module 85 adds the fourth vector V4 and the fifth vector V5 for generating a sum vector Vs.

The control signal CS is then calculated by the second Clarke calculation module 85, from the sum vector Vs, by an inverse Clarke transformation.

The inverse Clarke transformation is a mathematical transformation that cancels a Clarke transformation, i.e. the inverse Clarke transform of a vector's Clarke transform is the vector itself, and vice-versa. The inverse Clarke transform is performed by multiplying a vector by the inverse Clarke matrix IC.

The inverse Clarke matrix IC is defined mathematically as:

$$IC = \begin{pmatrix} 1 & 0 & 1 \\ -\frac{1}{2} & \frac{\sqrt{3}}{2} & 1 \\ -\frac{1}{2} & -\frac{\sqrt{3}}{2} & 1 \end{pmatrix} \quad \text{(Equation 10)}$$

The control signal CS is calculated using the equation:

$$CS = IC \cdot Vs \quad \text{(Equation 11)}$$

The control signal CS is then transmitted to the inverter 20.

When the second calculation step 220 is completed, the supply step 110 is then reiterated, using the newly calculated control signal CS.

Preferably, the supply step 110, the measuring step 120, the first calculating step 130, the first rotation step 140, the first subtraction step 150, the second rotation step 160, the second subtraction step 170, and the control step 180 are then reiterated in that order. This is shown on FIG. 3 by an arrow 230.

For example, all steps are reiterated with a constant iteration period Pi. The iteration period Pi is, for example, provided between 5 kHz Hz and 100 kHz. The control device 25 allows for controlling the second amplitude a2 of the undesired frequency component UF within acceptable limits so as not to cause overheating of the electrical apparatus 15.

In particular, the control device 25 allows for regulating undesired frequency components over a broad frequency range and for limiting the voltage and current of each phase P1, P2, P3 to acceptable ranges.

The reliability of the electrical installation 10 is therefore improved.

Additionally, as overheating of the electrical apparatus 15 is prevented, constraints in designing the electrical apparatus 15 are relaxed. The electrical apparatus 15 may therefore be designed according to less stringent safety requirements, at a lower cost.

The invention claimed is:

1. An electrical installation comprising:
a permanent-magnet synchronous motor comprising a rotation frequency for which the permanent-magnet synchronous motor produces a greatest rotational torque,
a three-phase inverter, and
a control device,
wherein the three-phase inverter generates a three-phase electrical current and supplies the permanent-magnet synchronous motor with the three-phase electrical current, the three-phase electrical current presenting a first frequency for operating the permanent-magnet synchronous motor, the three-phase electrical current also comprising an undesired frequency component presenting a second frequency, and the control device comprising:
a measurement module configured to measure a parameter of each phase of the three-phase electrical current, the measured parameters forming a measurement vector comprising a set of three numbers, each number being equal to currents of respective phases,
a first Clarke calculation module configured to calculate a Clarke transform of the measurement vector, the Clarke transform including a first vector containing two first values, the first vector being represented in a first basis of a two-dimensional vector space,
a command module for generating a control signal for controlling the three-phase inverter,
a first rotation module configured to generate a second vector containing two second values, the second vector being a representation of the first vector in a second basis of a two-dimensional vector space, the second basis rotating at the second frequency with respect to the first basis,
a first subtraction module configured to compare each second value to a corresponding first reference value for generating a corresponding first difference,
a second rotation module configured to generate a third vector containing two third values, the third vector being a representation of the first vector in a third basis of a two-dimensional vector space, the third basis rotating at the first frequency with respect to the first basis,
a second subtraction module configured to compare each third value to a corresponding second reference value for generating a corresponding second difference,
an identification module configured to calculate the second frequency from the first frequency,
a first integration module configured to calculate an integral of the second frequency, and
a second integration module configured to calculate an integral of the first frequency; wherein
the command module is configured to generate the control signal from the first differences and the second differences.

2. The electrical installation of claim 1, wherein the control device further provides an estimation module configured to measure a rotation frequency of the permanent-magnet synchronous motor and for estimating the first frequency from the rotation frequency.

3. The electrical installation of claim 1, wherein the command module further provides:
two proportional-integral controllers, each controller being configured to generate a first transitional signal from each first difference, both first transitional signals forming a first transitional vector,
a third rotation module configured to generate, from the first transitional vector, a fourth vector comprising fourth values, the fourth vector being a representation in the first basis of the first transitional vector, and
a second Clarke calculation module configured to calculate, from at least the fourth vector, a respective control value-for each phase of the three-phase electrical current.

4. The electrical installation of claim 1, wherein each first reference value is equal to zero.

* * * * *